May 26, 1970  F. M. WHITE  3,513,880
DUAL STAGE VALVE
Filed Sept. 12, 1968
FIG.1
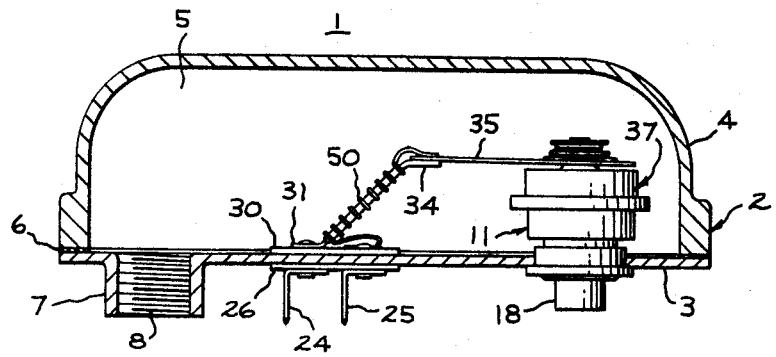
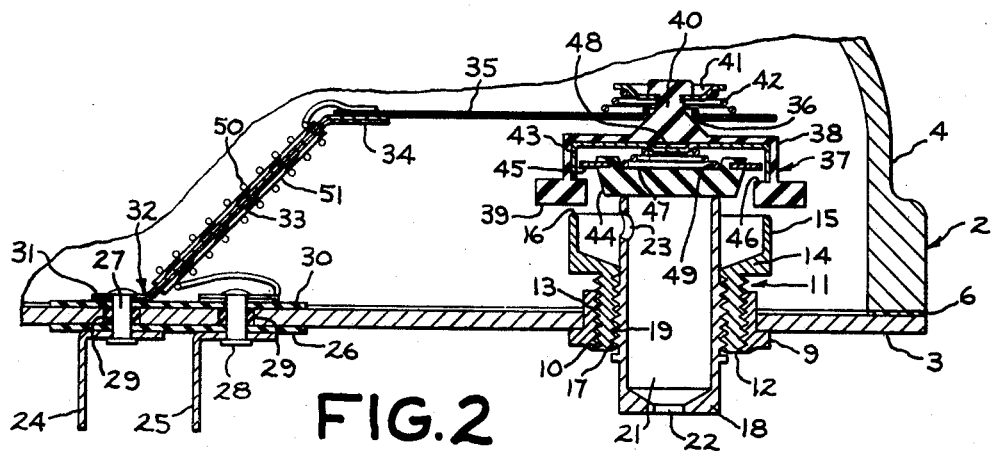
FIG.2
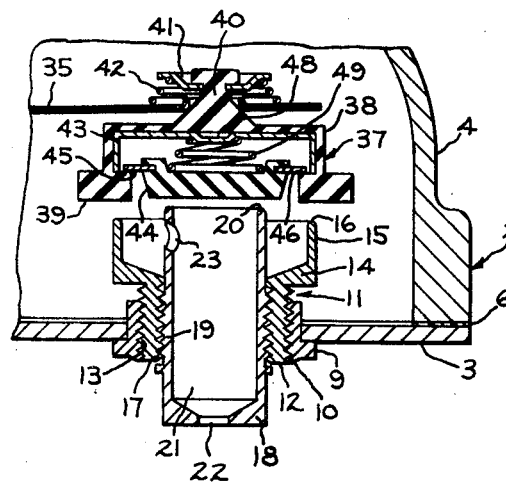
FIG.3
INVENTOR.
FREDERICK M. WHITE
BY Radford M. Kearns
HIS ATTORNEY

United States Patent Office 3,513,880
Patented May 26, 1970

---

3,513,880
DUAL STAGE VALVE
Frederick M. White, Louisville, Ky., assignor to General
Electric Company, a corporation of New York
Filed Sept. 12, 1968, Ser. No. 759,451
Int. Cl. F17d 1/04; F16k 11/14
U.S. Cl. 137—630.22                    15 Claims

ABSTRACT OF THE DISCLOSURE

A fluid flow control apparatus having outlet means including first and second openings to two fluid flow paths, and a valve having a first portion and a second portion. The valve is carried by a movable support so that a first movement of the support exposes the first opening for a first flow rate and a second, additional, movement of the support exposes the second opening for a second flow rate.

BACKGROUND OF THE INVENTION

This invention relates to fluid flow control apparatus such as gas valves. In many applications of gas valves it is desirable to have two basic rates of flow of gas available. Also it is often desirable to be able to modulate the flow in the range between the two basic rates. In the past the two rates of flow have been accomplished by using two, entirely separate valves which are mounted in parallel in the supply system. One valve is opened for the lower rate of flow and both are opened for the higher rate of flow. Such duplicate arrangements substantially increase the complexity and cost of the flow control assembly and often cause undue complication of the associated control circuitry.

An object of the present invention is to provide a new and improved flow control apparatus.

Another object of this invention is to provide such an apparatus in which a single, composite valve is capable of providing two different flow rates.

Still another object of this invention is to provide such an apparatus in which the two flow rates are provided as a result of different amounts of movement of a single support or operator.

A further object of this invention is to provide such an apparatus which is capable of modulation in the range between the high and low rates of flow.

SUMMARY OF THE INVENTION

By one form of the present invention there is provided a fluid flow control apparatus having an outlet means which includes first and second openings for the entry of fluid thereto. A valve support means is mounted so as to be movable relative to the openings to the outlet means and a valve is carried by the support means. The valve includes a first valve portion normally associated with the outlet means to close both openings and movable to expose the first opening in response to a first predetermined movement of the support means. The valve also includes a second valve portion normally associated with the outlet means to close the second opening and movable to expose the second opening in response to an additional predetermined movement of the support means. Thereby, the flow control apparatus selectively will pass fluid at two different rates.

BRIEF DESCRIPTION OF THE DRAWING

FIG. 1 is a somewhat diagrammatical showing, in section, of a flow control apparatus embodying one form of the invention;

FIG. 2 is a partial, enlarged view of the control apparatus of FIG. 1, illustrating its partially open position; and FIG. 3 is a partial, enlarged view of the apparatus of FIG. 1 showing its fully open position.

DESCRIPTION OF THE PREFERRED EMBODIMENTS

Referring now to the drawings there is shown a fluid flow control apparatus or gas flow control valve arrangement 1 incorporating one embodiment of the present invention. The apparatus 1 includes a housing 2 formed from a base 3 and a cover 4 with the housing defining a chamber 5. The base 3 and cover 4 are joined together by any suitable means with a gasket 6 captured therebetween to prevent unwanted fluid leakage between these two members. An inlet to the chamber 5 is provided by the bushing or nipple 7 formed in the base 3. The bushing is adapted to be attached to any suitable source of fluid such as a gas by using the threaded section indicated at 8.

As best seen in FIGS. 2 and 3 a suitable outlet is provided by means of a similar bushing 9, which is also mounted in and extending through the base 3 in fluid tight relationship thereto. The bushing 9 is provided with internal threads 10 to receive a composite valve seat arrangement generally indicated at 11. This arrangement includes an outer, hollow stud or tube 12 which is provided with external threads 13 for cooperation with the threads 10 to mount the stud 12 within the bushing 9 and thus the housing 2. Within the chamber 5 the stud 12 flares outwardly as shown at 14 and then terminates in an axially extending, tubular wall portion 15. The upper edge of the wall 15 as viewed in FIGS. 2 and 3 defines an outer, circular valve seat 16.

The radially inner surface of the stud 12 is provided with threads 17. An inner, hollow stud or shaft 18 is provided with exterior threads 19 for cooperation with the threads 17 to mount the inner stud 18 within the outer stud 12. The upper end of the stud 18 as viewed in FIGS. 2 and 3 defines an inner annular valve seat 20. With this arrangement the positioning of both the outer valve seat 16 and the inner valve seat 20 may be varied or adjusted for suitable purposes such as calibration.

The inner surface of the stud 18 defines an outlet conduit 21 which terminates in an outlet or main orifice 22. The side wall of the stud 18 is provided with a second or series orifice 23. As will be more fully explained hereinafter, this orifice 23 provides an entrance to the outlet conduit 21 through which fluid may flow when the outer valve seat 16 is open even if the inner seat 20 is closed.

A pair of electrical terminals 24 and 25 are mounted to the outside of base 3 and insulated therefrom by a sheet 26 of insulation material. Each of the terminals is secured to the base by means of a conductive rivet, 27 and 28 respectively. The rivets extend through the base 3 and are insulated from the base of means of insulating bushings 29. The inner end of each rivet is insulated from the base 3 by an inner sheet 30 of insulation material.

One end 31 of a control bimetal is held between the inner end of the rivet 27 and the sheet 30. The bimetal also includes a mid portion 33 which extends inwardly away from the base 3 and terminates in an opposite end 34, which is bent from the mid portion so as to extend toward the valve seat arrangement.

Attached to the free end 34 of the bimetal 33 by any suitable means such as by spot welding is a valve support member 35. This member 35 in the preferred embodiment shown comprises an ambient compensating bimetal. From the control bimetal 34 the valve support member 35 extends to a point at least in alignment with the valve seat arrangement 11. At this position it is provided with an opening 36 by means of which a suitable valve assembly, generally indicated at 37, is mounted to the member 35. Thus the control bimetal and the member 35 provide a valve support means by which the valve assembly 37 may be moved toward and away from the valve seat assembly 11.

The valve assembly includes a first or outer valve portion 38, which is of a generally cup shaped configuration and is provided with a lower edge or wall 39 disposed to engage the outer valve seat 16 so as to prevent flow over this seat. Substantially in alignment with the outlet conduit 21, the outer valve portion 38 includes a center post 40 which extends away from the valve seat assembly and through the opening 36 in the leaf spring. A cup like disc 41 is mounted on the post, on the opposite side of the leaf spring 35 from the valve seat assembly, and a coil spring 42 is received between the disc 41 and the support member 35. With this arrangement the outer valve portion is mounted on the support 35 to be carried thereby but with some degree of freedom of movement between the spring 35 and the valve portion 38.

The outer valve portion 38 is hollow and includes a cup like reinforcing or stiffening members 43. A second or inner valve portion 44 is received in the hollow interior of the outer valve portion 38 and is sufficiently large to overlie the inner valve seat 20 to close off flow over the inner valve seat when the inner valve portion engages it. A ring shaped member 45 of stiff material extends outwardly from the inner valve portion 44 and overlies a ledge 46 provided on the radially inner side of the outer valve portion 38.

The top of the inner valve portion is provided with a recess 47 and the reinforcing member 43 is provided with an aligned embossment 48. A coil spring 49 is mounted between the recess 47 and embossment 48 and serves two purposes. First, it helps to maintain the inner valve portion centered within the outer valve portion. Secondly, as the outer valve portion begins to open, that is, move away from the valve seat assembly, the spring 49 keeps the inner valve portion firmly seated against the inner valve seat 20 until the ring member 45 is engaged by the ledge 46 to move the inner valve portion away from the inner valve seat.

An insulated heater wire 50 is wound about the central or mid portion 33 of the control bimetal 32 to form a heater, the wire being separated from the bimetal by a sheet 51 of insulation. The sheet 51 may be formed in any suitable manner. One such way is to wrap the control bimetal with an insulating tape. One end of the wire 50 is connected to the rivet 28 while the other end is connected to the leaf spring 35. Since the leaf spring 35 is connected to the bimetal 32, which is connected to the rivet 27, a circuit is completed from the terminal 25 to the terminal 24. A suitable control circuit may be connected to the terminals to supply current for heating the control bimetal to cause operation of the entire fluid flow control apparatus.

As a current passes through the wire 50 and control bimetal 32 the control bimetal begins to heat and deflects counterclockwise, as seen in the drawing. This tends to move the support member 35 counterclockwise and this movement member causes the coil spring 42 to be compressed and the support member 35 to be flexed.

This deflection of spring 42 and 35 results from the fact that the pressure of the fluid acting on the outer valve portion 38 holds it against the valve seat arrangement. After a first predetermined movement of the control bimetal, the force build-up in the support member 35 and the coil spring 42 will be sufficient to overcome the fluid pressure and cause the first or outer valve portion 38 to snap open, that is, to snap away from the outer valve seat 16. When this occurs, the flow control apparatus no longer prevents fluid flow through the outlet and fluid or gas may flow over the outer seat 16, through the series orifice 23, the outlet conduit 21 and the main orifice 22. In the valve assembly shown the diameter of the outer seat 16 is sufficiently large in comparison to the size of the series orifice 23 that essentially any opening of the outer valve portion will cause a step type fluid flow. That is, the orifices 22 and 23 in series will provide the effective restriction or control of the flow of fluid and the flow will be the same no matter how far the edge 34 moves from the seat 16.

Continued heating of the control bimetal 32 causes it to continue to bend counterclockwise so as to move the valve support member 35 and thus the outer valve portion 38 away from the valve seat assembly 11. During this movement the spring 49 holds the inner valve portion 44 against the inner valve seat 20. After an additional predetermined amount of movement the ledge 46 engages the ring member 45 and forceably lifts the inner valve portion 44 from the inner valve seat 20, as shown in FIG. 3. When this occurs, fluid may flow from the chamber 5 over the valve seat 16 and then follow two paths. The first of these is through the series orifice 23 to the outlet conduit 21 and the other is over the inner valve seat 20 to the outlet conduit 21. With the inner valve portion removed from the inner valve seat the maximum fluid flow is determined by the main orifice 22. However, until the inner valve portion 44 has moved away from the inner seat 20 a sufficient distance to reach the maximum flow allowed by the orifice 22, movement of the inner valve portion with respect to the inner valve seat will cause the amount of fluid flowing from the control apparatus to be modulated. This movement may be controlled by a suitable circuit controlling the energization of the wire 50. One such suitable control is described and claimed in applicant's copending application Ser. No. 759,421 filed concurrently herewith.

When the coil of heating wire 50 is de-energized, the bimetal 32 will begin to bend clockwise, as seen in the drawings. First, this slowly reduces the fluid flow, as the inner valve portion 44 approaches the inner valve seat 20, and, when it engages the valve seat the first stage level of flow is reached. At this time the flow is only through the series orifice 23 to the conduit 21. As the bimetal continues to cool the edge 39 of the outer valve portion 38 approaches the outer valve seat 16. As it gets very close to the venturi effect of the fluid flowing between these two surfaces will cause the valve to snap closed.

The threaded construction of the two hollow studs 12 and 18 make it possible to adjust the position of the valve seats 16 and 20 relative to the valve portions 38 and 44 so that the amounts of movement of the control bimetal and the valve support member 35 necessary to provide each of the two stages of gas flow may be separately and independently adjusted.

Preferably, as mentioned above, the valve support 35 comprises an ambient compensating bimetal. The effect of the bimetal is to make the action of the valve substantially independent of changes in the ambient temperature to which the valve may be subjected. It will be understood that gas control valves are often incorporated in apparatus much as clothes dryers where the interior temperature varies substantially between the initiation of operation and its termination, and that it is important that the action of the valve not be affected by these temperature changes.

The ambient compensating bimetal 35 responds to changes in the ambient temperature so as, in effect, to cancel the response of the main control bimetal 33 to the same temperature changes. An increase in the ambient temperature causes the main bimetal 34 to bow in a direction toward opening the valve. However, the same increase in temperature causes the bimetal 35 to bow such that its outer end mounting the valve assembly 37 flexes downwardly. The resultant or cancelling effect between the two bimetals is such that there is substantially no displacement of the portion of bimetal 35 mounting the valve assembly 37. Thus, the valve is not affected by ambient temperature to any appreciable degree, and the valve action is dependent solely upon the movement of the main bimetal 34 in response to the heater 50.

In the event ambient compensation should not be required, other means than a bimetal might be used to form the valve support member. A preferably means in that case would be a leaf spring of appropriate strength, together with the other valve element, to provide the snap action discussed above.

While in accordance with the patent statutes I have shown and described what at present is considered to be a preferred embodiment of my invention, it will be understood that various changes and modifications may be made therein without departing from the invention, and I therefore intend by the appended claims to cover all such variations as fall within the true spirit and scope of the invention.

What is claimed as new and desired to be secured by Letters Patent of the United States is:

1. A fluid flow control apparatus comprising:
   (a) outlet means having first and second opening means for the entry of fluid thereto;
   (b) a valve support means movable relative to said outlet means;
   (c) a valve carried by said support means;
   (d) said valve including a first valve portion normally associated with said outlet means to close both opening means and being movable to expose said first opening means in response to a first predetermined movement of said support means;
   (e) said valve further including a second valve portion normally associated with said outlet means to close said second opening means and being movable to expose said second opening means in response to an additional predetermined movement of said support means;
   (f) whereby said flow control apparatus selectively will pass fluid at two different rates.

2. The invention as set forth in claim 1 further including resilient means connecting said first valve portion of said support means to provide a snap-action movement of said first valve portion for exposing said first opening means.

3. The invention as set forth in claim 1 wherein:
   (a) said first opening comprises a valve seat;
   (b) said support means defines an aperture therein;
   (c) said first valve portion includes a post extending away from said valve seat through said aperture; and
   (d) a spring is operatively mounted between said post and said support means to be compressed as said support means moves away from said valve seat;
   (e) the compression of said spring being sufficient, when said support means moves away from said seat said first predetermined distance, to move said first valve portion from said valve seat with a snap action.

4. The invention as set forth in claim 1 including lost motion means connecting said first and second valve portions so that said first valve portion moves said second valve portion to expose said second opening means in response to said additional predetermined movement of said support means.

5. The invention as set forth in claim 4 wherein said second opening means comprises an additional valve seat, and resilient biasing means is provided for positively urging said second valve portion into engagement with said additional valve seat until moved therefrom by said first valve portion.

6. A fluid flow control apparatus comprising:
   (a) an outer valve seat;
   (b) an inner valve seat defining an outlet and an opening connecting said outlet to said outer valve seat;
   (c) a valve support means movable relative to said valve seats;
   (d) a valve carried by said support means;
   (e) said valve including a first valve portion normally engaging said outer seat to prevent fluid flow and being moved from said outer seat in response to a first predetermined movement of said support means to allow fluid flow through said opening to said outlet;
   (f) said valve further including a second valve portion normally engaging said inner seat to prevent fluid flow directly to said outlet; said second valve portion being moved from said inner seat in response to an additional predetermined movement of said support means to allow fluid flow directly to said outlet;
   (g) whereby said flow control apparatus selectively will pass fluid at two different rates.

7. The invention as set forth in claim 6 further including resilient means connecting said first valve portion to said support means to provide a snap-action movement of said first valve portion from said outer seat.

8. The invention as set forth in claim 6 wherein:
   (a) said support means defines an aperture therein;
   (b) said first valve portion includes a post extending away from said valve seats through said aperture; and
   (c) a spring is operatively mounted between said post and said support means to be compressed as said support means moves away from said valve seats;
   (d) the compression of said spring being sufficient, when said support means moves away from said seats said first predetermined distance, to move said first valve portion from said outer valve seat with a snap action.

9. The invention as set forth in claim 6 including lost motion means connecting said first and second valve portions so that said first valve portion moves said second valve portion from said inner seat in response to said additional predetermined movement of said support means.

10. The invention as set forth in claim 9 wherein resilient biasing means is provided for positively urging said second valve portion into engagement with said inner valve seat until moved therefrom by said first valve portion.

11. The invention as set forth in claim 6 wherein said outlet includes means defining a main orifice for controlling the maximum rate of flow through said flow control apparatus.

12. The invention as set forth in claim 11 wherein said opening in said inner valve seat defines a second orifice in series with said main orifice for controlling the maximum rate of flow when said support means has moved less than said additional predetermined distance.

13. The invention as set forth in claim 6 further including means for adjusting the position of said outer valve seat relative to said support means for setting said first predetermined movement of said support means.

14. The invention as set forth in claim 6 further including means for adjusting the position of said inner valve seat relative to said support means for setting said additional predetermined movement of said support means.

15. The invention as set forth in claim 13 further including means for adjusting the position of said inner valve seat relative to said support means for setting said additional predetermined movement of said support means.

References Cited

UNITED STATES PATENTS

| | | | |
|---|---|---|---|
| 2,911,010 | 11/1959 | Lamburn | 137—629 |
| 3,118,471 | 1/1964 | Wright | 137—630.19 |
| 3,194,268 | 7/1965 | Vicenzi | 137—630.19 X |
| 3,229,956 | 1/1966 | White | 251—11 |
| 3,275,035 | 9/1966 | Freeby | 137—630.14 |

CLARENCE R. GORDON, Primary Examiner

U.S. Cl. X.R.

251—11